Jan. 14, 1941.  C. V. WATKINS  2,228,799
HYDRAULIC TRANSMISSION
Filed Nov. 15, 1939    3 Sheets-Sheet 2

Inventor
C. V. Watkins
By Clarence A. O'Brien
and Hyman Berman
Attorneys

Jan. 14, 1941.   C. V. WATKINS   2,228,799
HYDRAULIC TRANSMISSION
Filed Nov. 15, 1939   3 Sheets-Sheet 3

Inventor
C. V. Watkins

By Clarence A. O'Brien
and Hyman Berman
Attorneys

Patented Jan. 14, 1941

2,228,799

UNITED STATES PATENT OFFICE 2,228,799

HYDRAULIC TRANSMISSION

Carl V. Watkins, Sultan, Wash.

Application November 15, 1939, Serial No. 304,628

2 Claims. (Cl. 192—60)

The present invention relates to new and useful improvements in hydraulic transmissions particularly for automobiles and has for its primary object to provide, in a manner as hereinafter set forth, a device of this character embodying means whereby any desired power or speed ratio between the engine and the rear wheels of the vehicle may be had.

Another very important object of the invention is to provide, in a hydraulic transmission of the valve controlled type, novel means for actuating the valves.

Other objects of the invention are to provide a hydraulic transmission of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 5 is a cross sectional view, taken substantially on the line 5—5 of Fig. 1.

Figure 1:
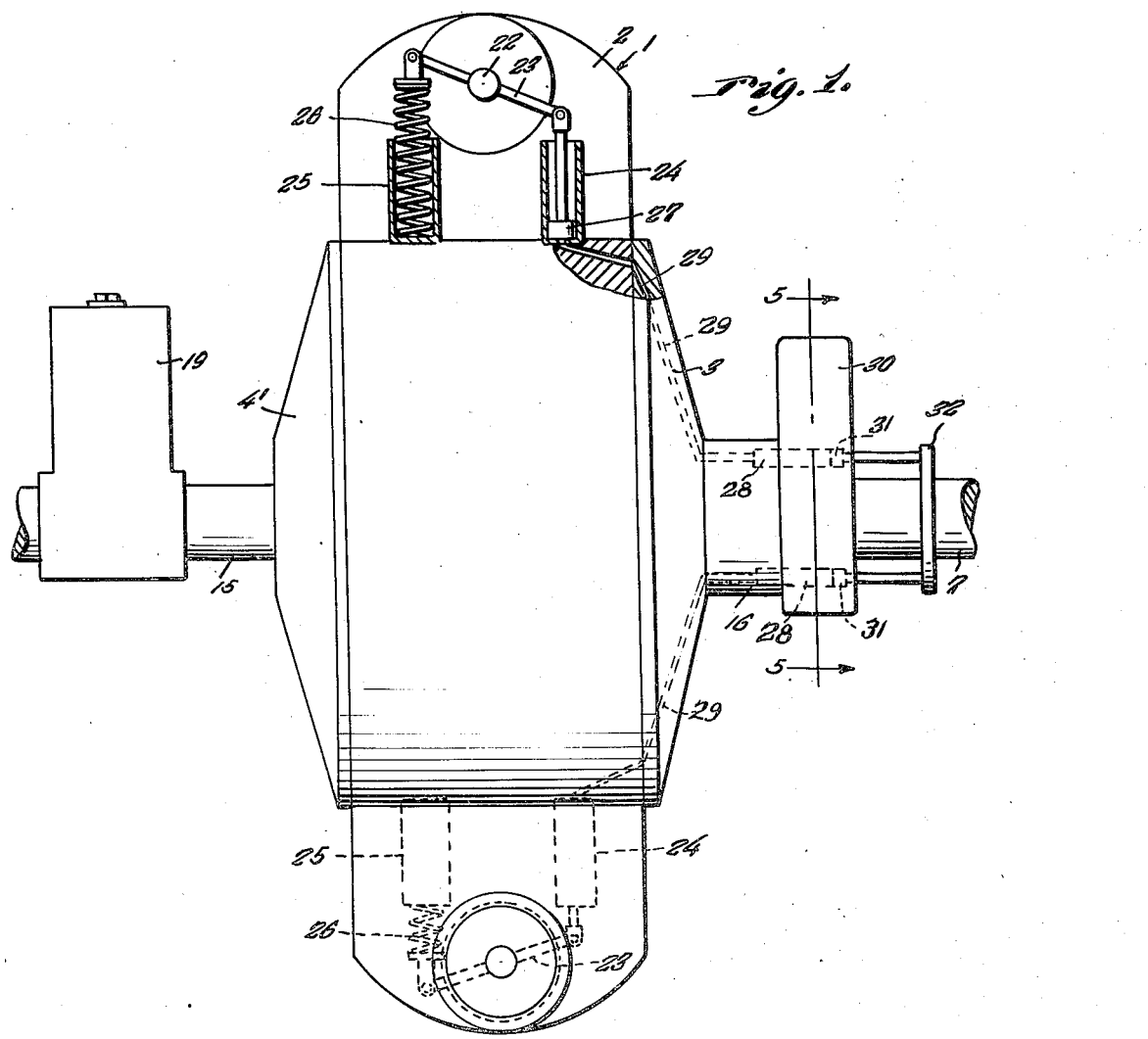
Figure 1 is a view in side elevation of a hydraulic transmission constructed in accordance with the present invention, portions thereof being shown in vertical section.

Referring now to the drawings in detail, it will be seen that the embodiment of the invention which has been illustrated comprises a housing of suitable metal which is designated generally by the reference numeral 1. The housing 1 includes parts or sections 2, 3 and 4'. Formed in the housing 1 are diametrically opposite pairs of radial cylinders 4. The pairs of cylinders 4 communicate with each other through passages 5 which are controlled by rotary valves 6.

Extending rotatably into the housing 1 through the front thereof is a drive shaft 7 which is connected directly to the engine (not shown) of the vehicle. Formed on the shaft 7 and operable in the housing 1 are eccentrics 8. Journaled on the eccentrics 8 are substantially square bearings 9 which are mounted for reciprocation in followers 10. The followers 10, in turn, are mounted for reciprocation in guideways 11 which are provided therefor in the housing 1. The reference numeral 12 designates pistons which are operable in the cylinders 4 and which are connected to the followers 10 by rods 13. Thus, the pistons 12 are connected to the shaft 7 for actuation thereby. It may be well to here state that the cylinders 4 are for the reception of a suitable fluid and it will be observed that the construction and arrangement is such that this fluid will be caused to flow back and forth between the pairs of cylinders through the passages 5 when the shaft 7 is rotating and the valves 6 are open or partially open. Bearings 14 are provided in the end members 3 and 4' for the shaft 7.

Extending rearwardly from the member 4' of the housing 1 is a driven shaft 15. Projecting forwardly from the member 3 of the housing 1 is a hub 16. The housing 1 is rotatably mounted in supports 17, bearings 18 being provided for said housing. It will be noted that the hub 16 is journaled in one of the bearings 18 and that the shaft 15 is journaled in the other of said bearings. Mounted on the shaft 15 is a fluid reservoir 19. The reservoir 19 communicates with the cylinders 4 for replenishing the fluid therein through passages 20 in the shaft 15 and the housing 1. Air under pressure is to be injected in the reservoir 19 in any suitable manner for forcing the fluid therefrom to the cylinders 4. Suitable check valves 21 are provided for preventing the return of the fluid to the reservoir 19.

Figure 4:
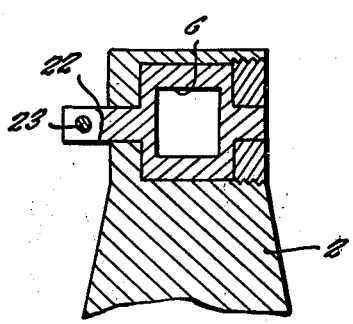
Figure 4 is a view in vertical section through one of the control valves, taken substantially on the line 4—4 of Figure 2.

Projecting from one end of the valves 6 are stems 22 (see Fig. 4) having mounted thereon crossheads 23. Mounted on the housing 1, adjacent the crossheads 23, are cylinders 24 and cups 25. The cups 25 accommodate coil springs 26 which are operatively connected to one end of the crossheads 23 for opening the control valves 6. Fluid actuated pistons 27 are operable in the cylinders 24 and connected to the other ends of the crossheads 23 for closing the valves 6.

The hub 16 of the housing 1 has formed therein cylinders 28 which communicate with the cylinders 24 through passages 29 in said housing. The cylinders 28 are adapted to receive fluid from a reservoir 30 on the hub 16. Pistons 31 are operable in the cylinders 28 for forcing the fluid therefrom through the passages 29 into the cylinders 24 for actuating the pistons 27. The pistons 31 are connected to a ring 32 which is rotatably and slidably mounted on the shaft 7. The ring 32 may be shifted longitudinally on the shaft 7 by a lever (not shown) or any other suitable means.

Figure 2:
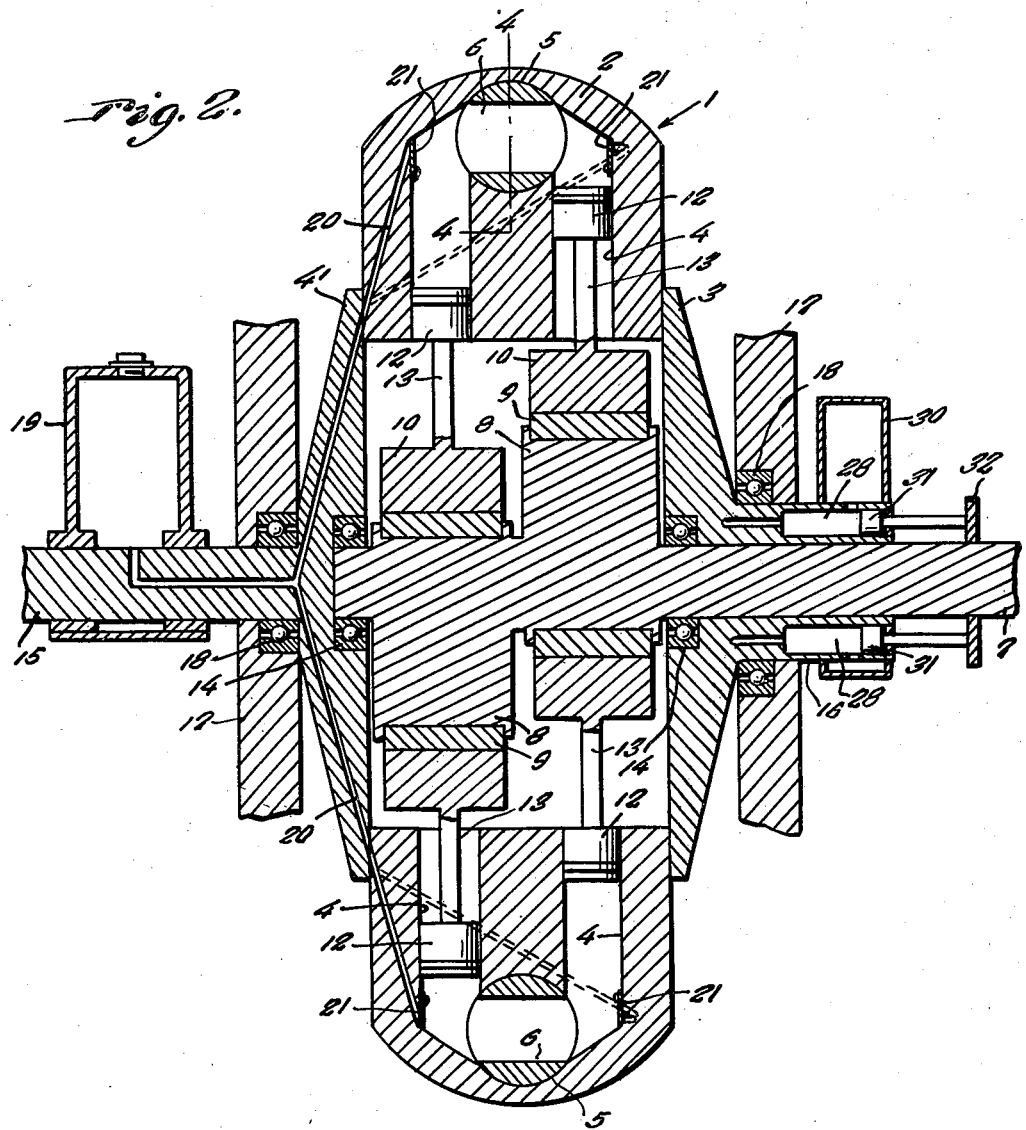
Figure 2 is a view in vertical longitudinal section through the transmission.
Figure 3:
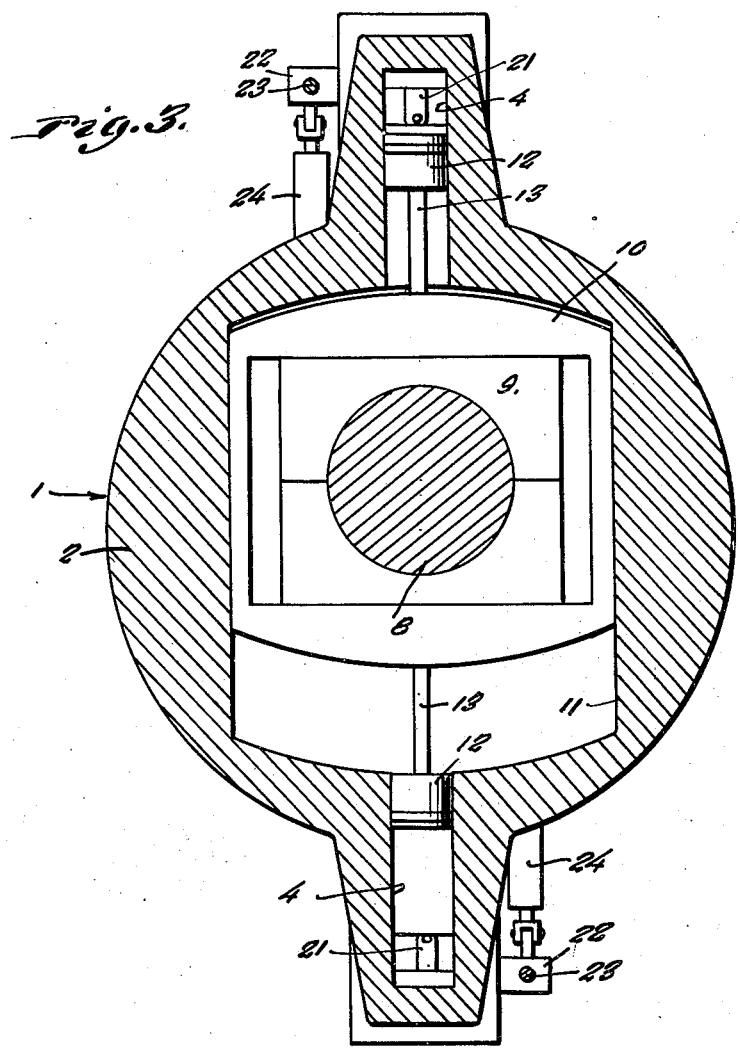
Figure 3 is a cross sectional view.

It is thought that the operation of the transmission will be readily apparent from a consideration of the foregoing. Briefly, with the valves 6 in open position, as seen in Fig. 2 of the drawings, the shaft 7 is free to rotate independently of the housing 1, the pistons 12 reciprocating freely in the cylinders 4 and forcing the fluid back and forth therebetween through said valves. To connect the housing 1 and the shaft 15 to the shaft 7 for actuation thereby, the valves 6 are rotated toward closed position. Of course, as the valves 6 are moved toward closed position the passage of the fluid therethrough is restricted and the shaft 15 begins to turn. The speed ratio of the shaft 15 to the shaft 7 is controlled by the position of the valves 6. When the valves 6 are fully closed the housing 1 and the shaft 15 rotate in unison with the shaft 7. To close the valves 6 the pistons are moved rearwardly in the cylinders 28. This forces the fluid from the cylinders 28 through the passages 29 into the cylinders 24 for actuating the pistons 27 thus rotating the valves 6 toward closed position against the tension of the coil springs 26. As hereinbefore stated, the fluid in the cylinders 4 may be replenished when necessary by injecting air under pressure into the reservoir 19 for forcing the fluid therefrom through the passages 20 past the check valves 21 into said cylinders.

It is believed that the many advantages of a hydraulic transmission constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A hydraulic transmission comprising a rotatably mounted housing, a driven shaft fixed to said housing for rotation therewith, a drive shaft extending rotatably into the housing, eccentrics on said drive shaft operable in the housing, pairs of communicating cylinders in the housing, said cylinders for the reception of a fluid, valves controlling the passages between the cylinders, followers mounted for reciprocation in the housing, pistons connected to said followers for actuation thereby and operable in the cylinders, bearings journaled on the eccentrics and operable in the followers for actuating same, and means for actuating the valves, the valve actuating means including coil springs mounted on the housing and operatively connected to the valves for actuating said valves to open position, fluid actuated pistons mounted on the housing and operatively connected to the valves for closing said valves, and fluid pressure means operatively connected to the last named pistons for actuating same.

2. A hydraulic transmission of the class described comprising a rotary housing, a driven shaft fixed to said housing for rotation therewith, a drive shaft extending rotatably into the housing, pairs of communicating cylinders in the housing, rotary valves controlling the communication between the pairs of cylinders, pistons operable in the cylinders, means operatively connecting said pistons to the drive shaft for actuation thereby, additional cylinders mounted on the housing, pistons operable in the second named cylinders and operatively connected to the valves for closing said valves, a hub projecting from one end of the housing and encircling the drive shaft, cylinders in said hub and adapted to receive a fluid, the housing having passages therein connecting the second named cylinders with the third named cylinders, and pistons operable in the third named cylinders for forcing the fluid therefrom through the passages into the second named cylinders for actuating the second named pistons for rotating the valves toward closed position, the first named cylinders being adapted to receive a fluid.

CARL V. WATKINS.